United States Patent
Chen et al.

(10) Patent No.: US 9,312,745 B2
(45) Date of Patent: Apr. 12, 2016

(54) UNIVERSAL POWER SUPPLY SYSTEM

(71) Applicant: ACBEL POLYTECH INC., New Taipei (TW)

(72) Inventors: Wei-Dar Chen, New Taipei (TW); Chung-Wei Yang, New Taipei (TW)

(73) Assignee: ACBEL POLYTECH INC., New Taipei ( * ) Notice: Subject to any disclaimer, the term of this patent is extended or adjusted under 35 U.S.C. 154(b) by 730 days.

(21) Appl. No.: 13/708,992

(22) Filed: Dec. 8, 2012

(65) Prior Publication Data

US 2014/0159497 A1    Jun. 12, 2014

(51) Int. Cl.
| | |
|---|---|
| H02J 1/00 | (2006.01) |
| H02J 3/00 | (2006.01) |
| H02J 1/10 | (2006.01) |
| H02M 1/32 | (2007.01) |
| G06F 1/18 | (2006.01) |
| G06F 1/28 | (2006.01) |

(52) U.S. Cl.
CPC ............... *H02M 1/32* (2013.01); *G06F 1/188* (2013.01); *G06F 1/28* (2013.01); *Y10T 307/707* (2015.04)

(58) Field of Classification Search
CPC ............ H02J 1/00; G06F 1/28; G06F 1/188
USPC .................................................. 307/43, 75, 82
See application file for complete search history.

(56) References Cited

U.S. PATENT DOCUMENTS

| 2009/0091191 A1* | 4/2009 | Tomioka | H02J 1/08 307/75 |
| 2011/0133560 A1* | 6/2011 | Yamashita | G06F 1/30 307/66 |

* cited by examiner

*Primary Examiner* — Thienvu Tran
*Assistant Examiner* — Rasem Mourad
(74) *Attorney, Agent, or Firm* — Pai Patent & Trademark Law Firm; Chao-Chang David Pai (57) ABSTRACT

A universal power supply system allows each board mounted DC power module or each AC/DC power supply device therein having identical dimensions and appearance to further have a specification setting circuit. When the board mounted DC power module or the AC/DC power supply device is plugged in a backboard module, the specification setting terminal outputs a specification identification signal to a monitoring circuit of the backboard module. As built in with a specification mapping table, the monitoring circuit can compare the specification identification signal to find a model number corresponding to the signal, and automatically sets a critical current value or critical power value of each board mounted DC power module for over-current protection or over-power protection. Accordingly, the universal power supply system can be adapted to different board mounted DC power modules or AC/DC power supply devices without redesigning the backboard module.

20 Claims, 8 Drawing Sheets

UNIVERSAL POWER SUPPLY SYSTEM

BACKGROUND OF THE INVENTION

1. Field of the Invention

The present invention relates to a universal power supply system and more particularly to a power supply system for industrial computers or servers.

2. Description of the Related Art

Figure 9:
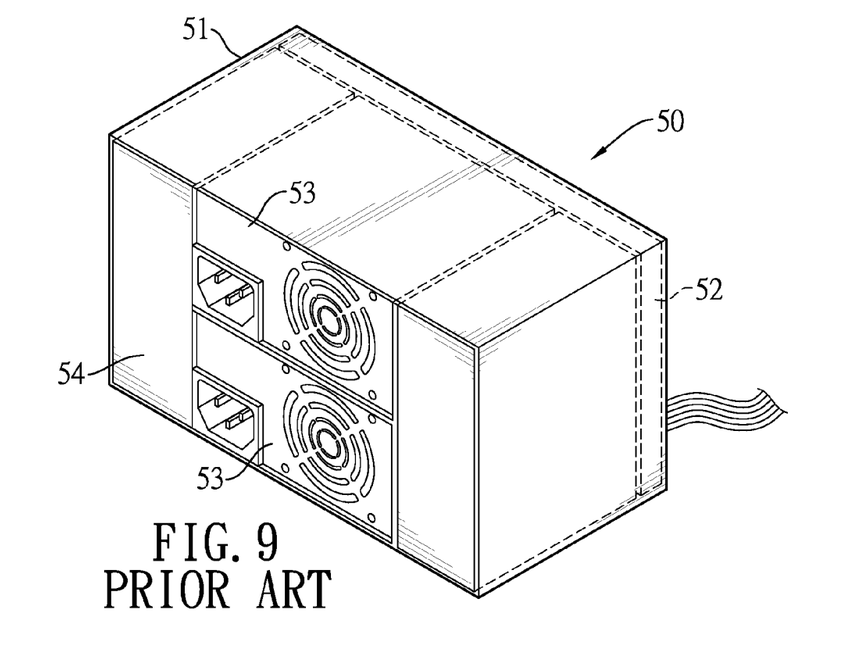
FIG. 9 is a perspective view of a conventional power supply system.
Figure 10:
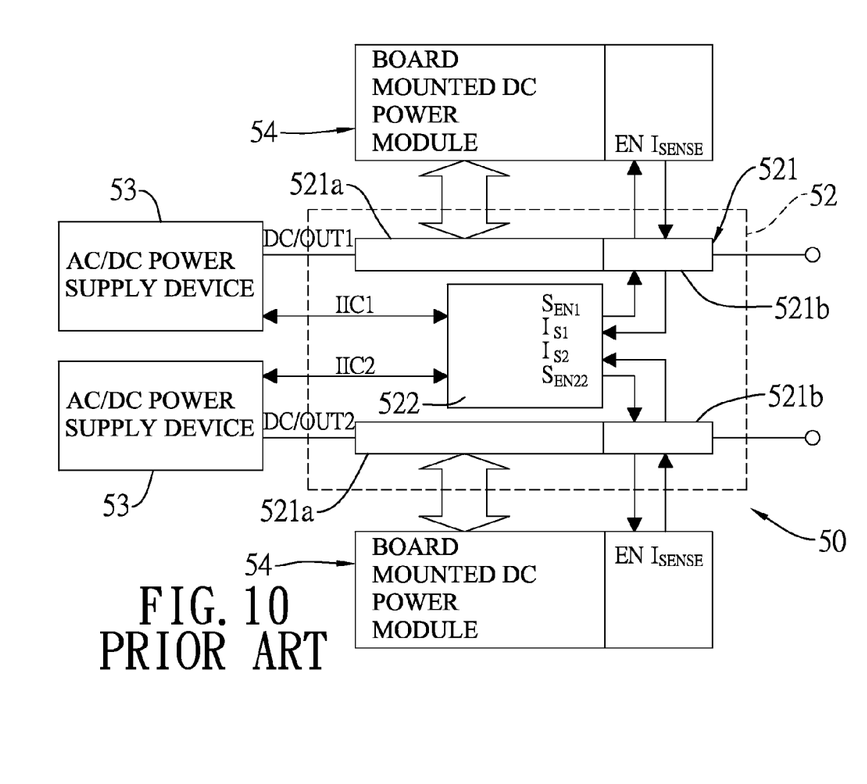
FIG. 10 is a functional block diagram of the conventional power supply system in FIG. 9.

Regular industrial computers or servers should be able to sustain long-time operation and therefore require operating power supplied from power supply systems with high power or redundant power. Because industrial computers or servers produced by computer manufacturers may have different power specifications, in response to such concern, manufacturers of regular power supply systems provide a modular power supply system. With reference to FIGS. 9 and 10, a conventional modular power system 50 has a housing 51, a backboard module 52, multiple AC-to-DC (AC/DC) power supply devices 53 and multiple board mounted DC power modules 54.

The housing 51 has a first opening and a second opening opposite to each other.

The backboard module 52 is mounted to the first opening of the housing 51, and has multiple DC power and communication interfaces 521 and a monitoring circuit 522. Each DC power and communication interface 521 has a DC power input/output (I/O) port 521a and a communication port 521b. The monitoring circuit 522 is electrically connected to each communication port 521b. The monitoring circuit has multiple enable terminals $S_{EN1}$, $S_{EN2}$, multiple current detection terminals $I_{S1}$, $I_{S2}$, and multiple critical current values and critical power values.

The AC/DC power supply devices 53 are mounted in the housing 51 through the second opening A DC power output terminal DC/OUT1, DC/OUT2 of each DC power supply device 53 is connected to the DC power I/O port 521a of a corresponding DC power and communication interface 521 and is connected to the monitoring circuit 522 of the backboard module 52 through a communication connection port (IIC1, IIC2).

The board mounted DC power modules 54 are mounted inside the housing 51 through the second opening. Each board mounted DC power module 54 has a terminal port, an enable terminal EN and a current output terminal $I_{SENSE}$ corresponding to the DC power and communication interface 521 of a corresponding backboard module 52 to acquire DC power outputted from a corresponding AC/DC power supply device 53, converts the DC power into a DC power with a specific voltage level, and outputs the converted DC power. The enable terminal EN and the current output terminal $I_{SENSE}$ are connected to the communication port 521b of the DC power and communication interface 521. The monitoring circuit 522 compares a current outputted from each board mounted DC power module 54 with a predetermined critical current value. If the output current is greater than the critical current value, the monitoring circuit 522 controls a corresponding enable terminal $S_{EN1}$, $S_{EN2}$ to disable the over-current board mounted DC power module 54 so as to prevent the power system 50 from burning out due to the over-current situation.

The AC/DC power supply devices 53 mounted inside the housing 51 of the modular power supply system 50 may have an identical wattage or different wattages. According to a power supply demand, the backboard module 52 is collaborated with the board mounted DC power module 54 to output in series or in parallel a DC power supplied from the respective AC/DC power supply devices 53 and converted from the respective board mounted DC power module 54. Alternatively, the DC power of one of the board mounted DC power modules 54 may serve as backup power. Furthermore, the monitoring circuit 522 of the backboard module 52 monitors if the current outputted from each board mounted DC power module 54 is in an over-current status when compared with a corresponding critical current value. If positive, the monitoring circuit 522 controls to disable the over-current board mounted DC power module 54 for over-current protection (OCP). Besides, as the backboard module 52 further provides over-power protection (OPP), the monitoring circuit 522 allows that the wattages of two AC/DC power supply devices are both 500 W during a parallel output (current share) mode when the modular power supply system 50 supplies 500 W DC power, or allows that each AC/DC power supply device outputs a 250 W DC power. The monitoring circuit 522 basically sets up 500 W as a critical power value. Once one of the AC/DC power supply devices is faulty, the other AC/DC power supply device supplies 500 W DC power alone. Hence, when two AC/DC power supply devices have the same wattage in operation, the critical power value can be fixed.

Because of a standardized design, when the modular power supply system 50 is repaired or the modular power supply system 50 with various wattages is built, the AC/DC power supply devices with different wattages satisfy the requirement and can be all mounted inside the housing. Hence, when the modular power supply system 50 is repaired, if one of the AC/DC power supply devices with 500 W is replaced by an 875 W AC/DC power supply device, the parallel output mode is not activated as the backboard module detects that the two AC/DC power supply devices supply power with different wattages (500 W, 875 W). Instead, one of the AC/DC power supply devices is enabled as a master while the other AC/DC power supply device functions as a slave. The master supplies power while the slave does not but only serves as a backup power source. If the 875 W AC/DC power supply device is selected as the master and the critical power value is still 500 W, damage arising from the over-power condition is inevitable.

As the AC/DC power supply devices and the board mounted DC power modules used by the modular power supply system are modularly designed, power supply manufacturers no longer need to redesign the corresponding circuits or circuit boards. All it needs is just to customize the backboard module based on the demands of different power wattages or types of power outputs.

However, the power wattage or DC power specifications of the modular AC/DC power supply devices and the board mounted DC power modules used by the power supply manufacturers can be hardly identified from the appearance. As a consequence, the modular power supply system assembled by the power supply manufacturers is thus prone to errors, such as a board mounted DC power module plugged in a wrong DC power I/O port of the backboard module. Additionally, the modular power supply system currently still replies on a customized backboard module preventing the production efficiency from being effectively increased.

SUMMARY OF THE INVENTION

An objective of the present invention is to provide a universal power supply system capable of being applicable to different board mounted DC power modules or AC/DC power supply devices used in the universal power supply system without redesigning a backboard module.

To achieve the foregoing objective, the universal power supply system has a housing, a backboard module, multiple AC/DC power supply devices and multiple board mounted DC power modules.

The backboard module is mounted to the housing and has multiple DC power and communication interfaces and a monitoring circuit.

Each DC power and communication interface has a DC power input and output (I/O) port.

The monitoring circuit is electrically connected to the DC power and communication interfaces and has multiple enable terminals, multiple current detection terminals, multiple specification identification terminals and a specification mapping table.

The specification mapping table is built in the monitoring circuit and stores multiple model numbers and multiple critical current values corresponding to the model numbers.

The AC/DC power supply devices at an input side are mounted inside the housing. Each AC/DC power supply device has a DC power output terminal connected to the DC power I/O port of one of the DC power and communication interfaces.

The board mounted DC power modules are mounted inside the housing, and are plugged in corresponding DC power and communication interfaces of the backboard module. Each board mounted DC power module has a specification setting circuit, a specification setting terminal, an enable terminal and a current output terminal.

The specification setting terminal is electrically connected to a corresponding specification identification terminal of the monitoring circuit.

The enable terminal is electronically connected to a corresponding enable terminal of the monitoring circuit.

The current output terminal is connected to a corresponding current detection terminal of the monitoring circuit.

The monitoring circuit reads a specification identification signal from the specification setting circuit of each board mounted DC power module, identifies a model number according to the specification identification signal, and maps to a corresponding critical current value in the specification mapping table.

From the foregoing, the universal power supply system allows each board mounted DC power module therein having identical dimensions and appearance to further have a specification setting circuit. When the board mounted DC power module is plugged in a backboard module, the specification setting terminal outputs a specification identification signal to the monitoring circuit of the backboard module. As built in with a specification mapping table, the monitoring circuit can compare the specification identification signal to find a model number corresponding to the signal, and automatically sets a critical current value or a critical power value of each board mounted DC power module for over-current protection. Accordingly, when all the board mounted DC power modules are plugged in the corresponding DC power I/O ports of the backboard module, the backboard automatically detects the model numbers of the board mounted DC power modules supplying power, and automatically monitors if each board mounted DC power module exceeds its corresponding critical current value for OCP without redesigning the backboard module due to different board mounted DC power modules applied therein.

Alternatively, the universal power supply system has a housing, a backboard module, multiple AC/DC power supply devices and multiple board mounted DC power modules.

The backboard module is mounted to the housing, and has multiple DC power and communication interfaces and a monitoring circuit.

Each DC power and communication interface has a DC power input and output (I/O) port.

The monitoring circuit is electrically connected to the DC power and communication interfaces and has multiple enable terminals, multiple specification identification terminals and a specification mapping table.

The specification mapping table is built in the monitoring circuit and stores multiple model numbers and multiple critical power values corresponding to the model numbers.

The AC/DC power supply devices at an input side are mounted inside the housing. Each AC/DC power supply device has a DC power output terminal, a specification setting circuit and a specification setting terminal.

The DC power output terminal is connected to the DC power I/O port of one of the DC power and communication interfaces.

The specification setting terminal is electrically connected to a corresponding specification identification terminal of the monitoring circuit.

The board mounted DC power modules are mounted inside the housing and are plugged in corresponding DC power and communication interfaces of the backboard module.

From the foregoing, the universal power supply system allows each board mounted DC power module therein having identical dimensions and appearance to further have a specification setting circuit. When the AC/DC power supply device is plugged in a backboard module, the specification setting terminal outputs a specification identification signal to the monitoring circuit of the backboard module. As built in with a specification mapping table, the monitoring circuit can compare the specification identification signal to find a model number corresponding to the signal, and automatically sets a critical current value or a critical power value of each AC/DC power supply device for over-power protection. Accordingly, when all the AC/DC power supply devices are plugged in the backboard module, the backboard automatically detects the model numbers of the AC/DC power supply devices supplying power, and automatically monitors if each AC/DC power supply device exceeds its corresponding critical power value for OPP without redesigning the backboard module due to different AC/DC power supply devices applied therein.

Other objectives, advantages and novel features of the invention will become more apparent from the following detailed description when taken in conjunction with the accompanying drawings.

DETAILED DESCRIPTION OF THE INVENTION

Figure 1:
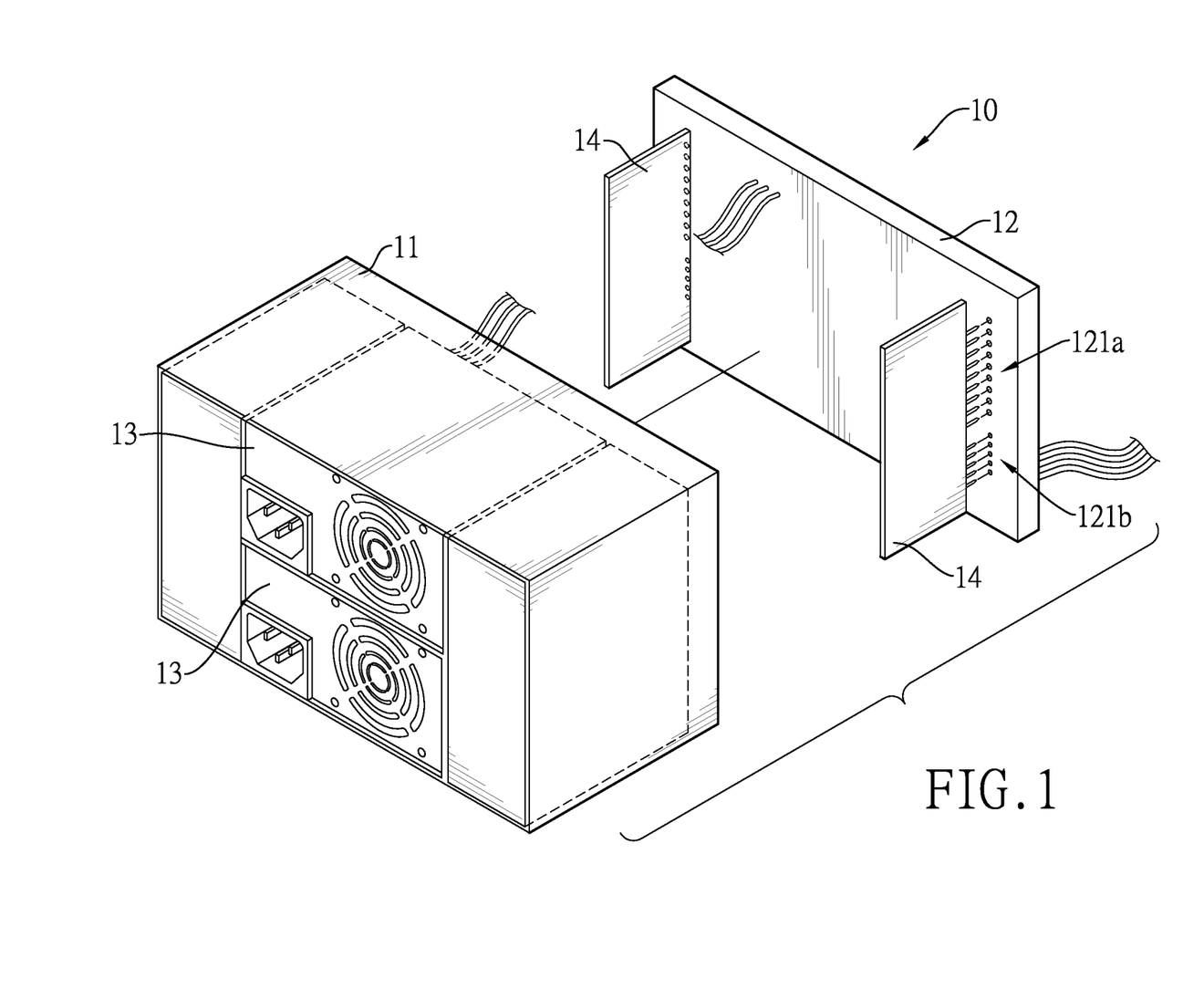
FIG. 1 is a partially exploded perspective view of a universal power supply system in accordance with the present invention.
Figure 2:
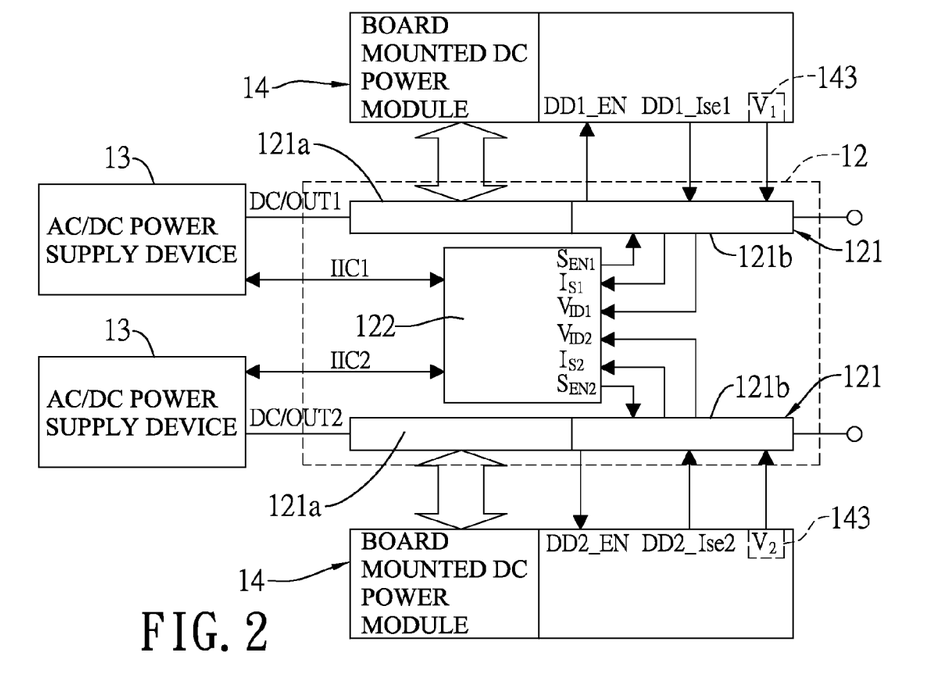
FIG. 2 is a functional block diagram of a first embodiment of the universal power supply system in FIG. 1.

With reference to FIGS. 1 and 2, a first embodiment of a universal power supply system 10 in accordance with the present invention has a housing 11, a backboard module 12, multiple AC/DC power supply devices 13 and at least one board mounted DC power module 14.

The housing 11 has a first opening and a second opening opposite to each other.

The backboard module 12 is mounted to the first opening of the housing 11, and has at least one DC power and communication interface 121 and a monitoring circuit 122. Each one of the at least one DC power and communication interface 121 has a DC power I/O port 121a and a communication port 121b. The monitoring circuit 122 is electrically connected to the at least one DC power and communication interface 121 and has at least one enable terminal $S_{EN1}$, $S_{EN2}$, at least one current detection terminal $I_{S1}$, $I_{S2}$, at least one specification identification terminal $V_{ID1}$, $V_{ID2}$ and a specification mapping table. In the present embodiment, the specification mapping table stores data associated with a model number, a voltage value and a critical current value corresponding to the model number.

The AC/DC power supply devices 13 are mounted in the housing 11 through the second opening A DC power output terminal DC/OUT1, DC/OUT2 of each DC power supply device 13 is connected to the DC power I/O port 121a of a corresponding DC power and communication interface 121 and is connected to the monitoring circuit 122 of the backboard module 12 through a communication connection port (IIC1, IIC2).

Figure 4:
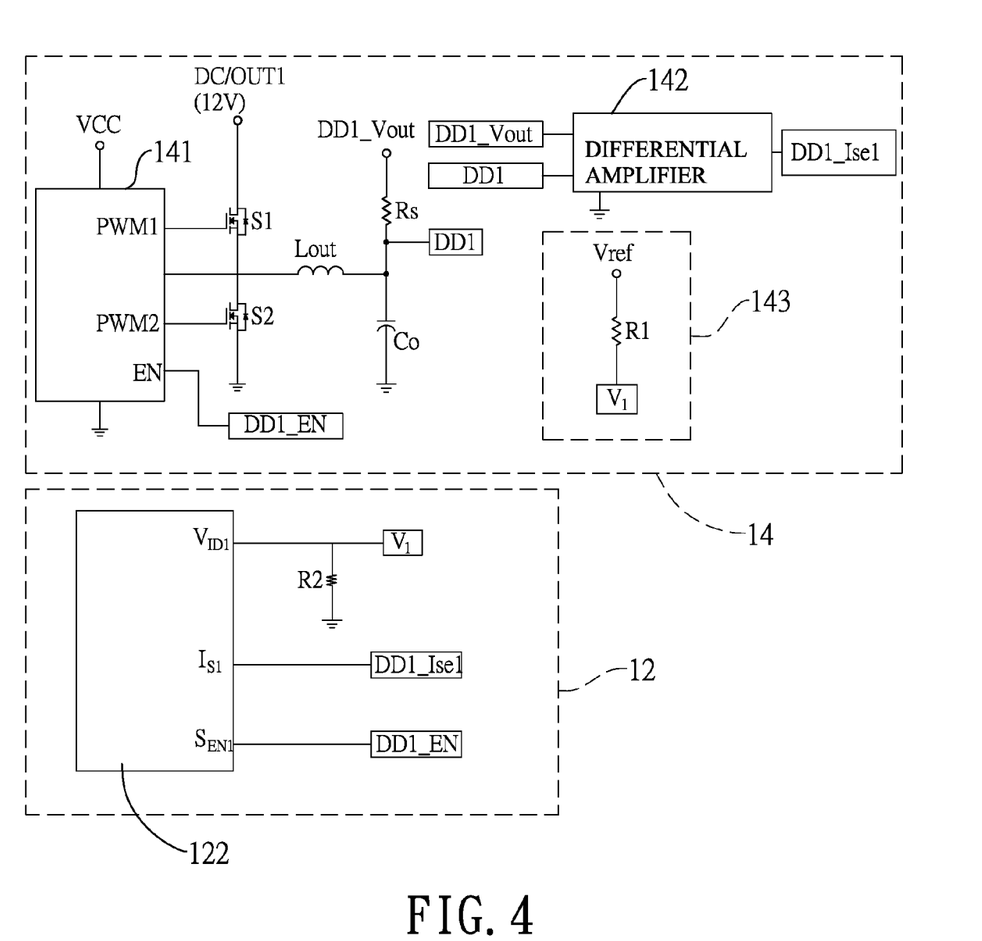
FIG. 4 is a circuit diagram of the universal power supply system in FIG. 2.

The at least one board mounted DC power module 14 is mounted in the housing 11 through the second opening, and is plugged in at least one corresponding DC power and communication interface 121 of the backboard module 12. Each one of the at least one board mounted DC power module 14 has a specification setting circuit 143, a specification setting terminal $V_1$, $V_2$, an enable terminal DD1_EN, DD2_EN, and a current output terminal DD1_Ise1, DD2_Ise2. The specification setting terminal $V_1$, $V_2$ is electrically connected to the specification identification terminals $V_{ID1}$, $V_{ID2}$ of the monitoring circuit 122. The enable terminal DD1_EN, DD2_EN of the board mounted DC power module 14 is electronically connected to a corresponding enable terminal $S_{EN1}$, $S_{EN2}$ of the monitoring circuit 122. The current output terminal DD1_Ise1, DD2_Ise2 is connected to a corresponding current detection terminal $I_{S1}$, $I_{S2}$. With reference to FIG. 4, each one of the at least one board mounted DC power module 14 has a controller 141, a DC power output terminal DD1_Vout and a current output circuit. The current output circuit has a current detector (resistor Rs) and a differential amplifier 142. Two input terminals of the differential amplifier 142 are connected to two ends of the current detector Rs, and the current detector Rs is connected in series with the DC power output terminal DD1_Vout and a DC power output port DD1 to detect the current outputted from the current output terminal DD1_Ise1 of the current board mounted DC power module 14.

Figure 3:
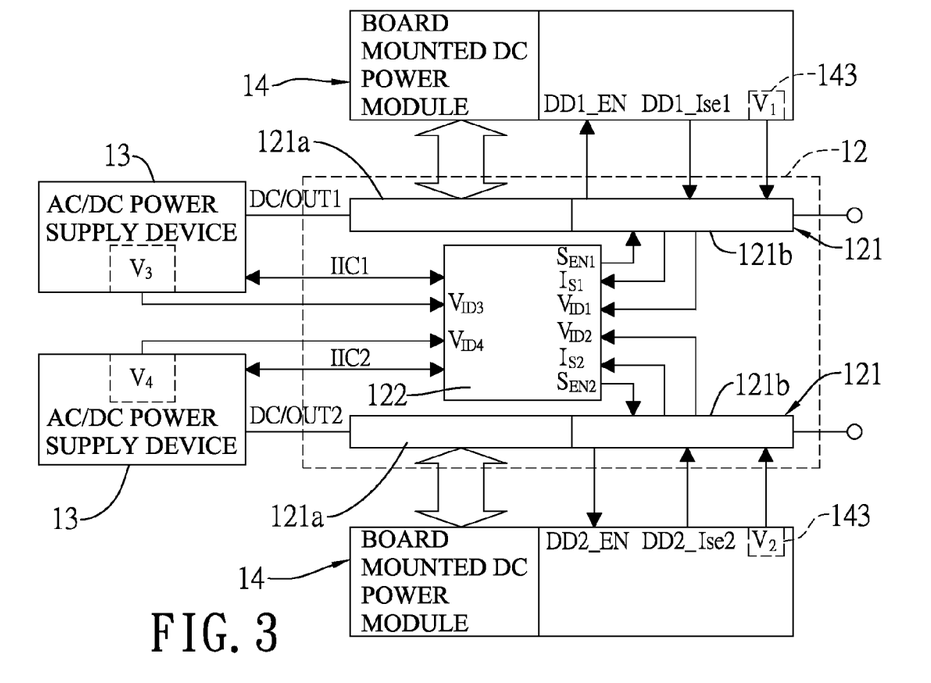
FIG. 3 is a functional block diagram of a second embodiment of the universal power supply system in FIG. 1.

With reference to FIG. 3, a second embodiment of a universal power supply system 10 in accordance with the present invention differs from the first embodiment in that each AC/DC power supply device 13 has a specification setting circuit and a specification setting terminal $V_3$, $V_4$, and the monitoring circuit 122 further has multiple specification identification terminals $V_{ID3}$, $V_{ID4}$ to respectively identify model numbers of the AC/DC power supply devices 13 and uses each model number to map to a corresponding critical power value in the specification mapping table built in the monitoring circuit 122. Additionally, the monitoring circuit can also just have the specification identification terminals $V_{ID3}$, $V_{ID4}$ to determine the model number of each AC/DC power supply device 13 without further having the specification identification terminals $V_{ID1}$, $V_{ID2}$ for determining the critical current value of each board mounted DC power module 14. However, the monitoring circuit 122 only considers the AC/DC power supply device(s) currently supplying power as target(s) to monitor, and selects the corresponding critical power value(s) to monitor the target(s).

With reference to FIG. 4, a circuit diagram of the first embodiment of the universal power supply system is shown. The monitoring circuit 122 is only connected to one board mounted DC power module 14. The specification setting circuit 143 of the board mounted DC power module is a voltage divider circuit 143 with a top resistor R1 and a bottom resistor R2. The voltage divider circuit 143 is connected to a reference voltage Vref and has a series connected node V1 connected to the specification identification terminal $V_{ID1}$. In the present embodiment, the bottom resistor R2 of the voltage divider circuit can be externally connected to the voltage divider circuit. In other words, one end of the top resistor R1 is connected to the reference voltage Vref, the other end of the top resistor R1 is connected to the specification setting terminal V1, the specification setting terminal V1 is further connected to one end of the externally connected bottom resistor R2, and the other end of the bottom resistor R2 is grounded. As the resistance values of the top resistor R1 and the bottom resistor R2 are fixed, the monitoring circuit 122 can compare the voltage of the specification identification terminal $V_{ID1}$ with the voltages in the specification mapping table to find a model number, maps the model number to a corresponding critical current value, and sets it as the critical current value of the board mounted DC power module 14.

Figure 5:
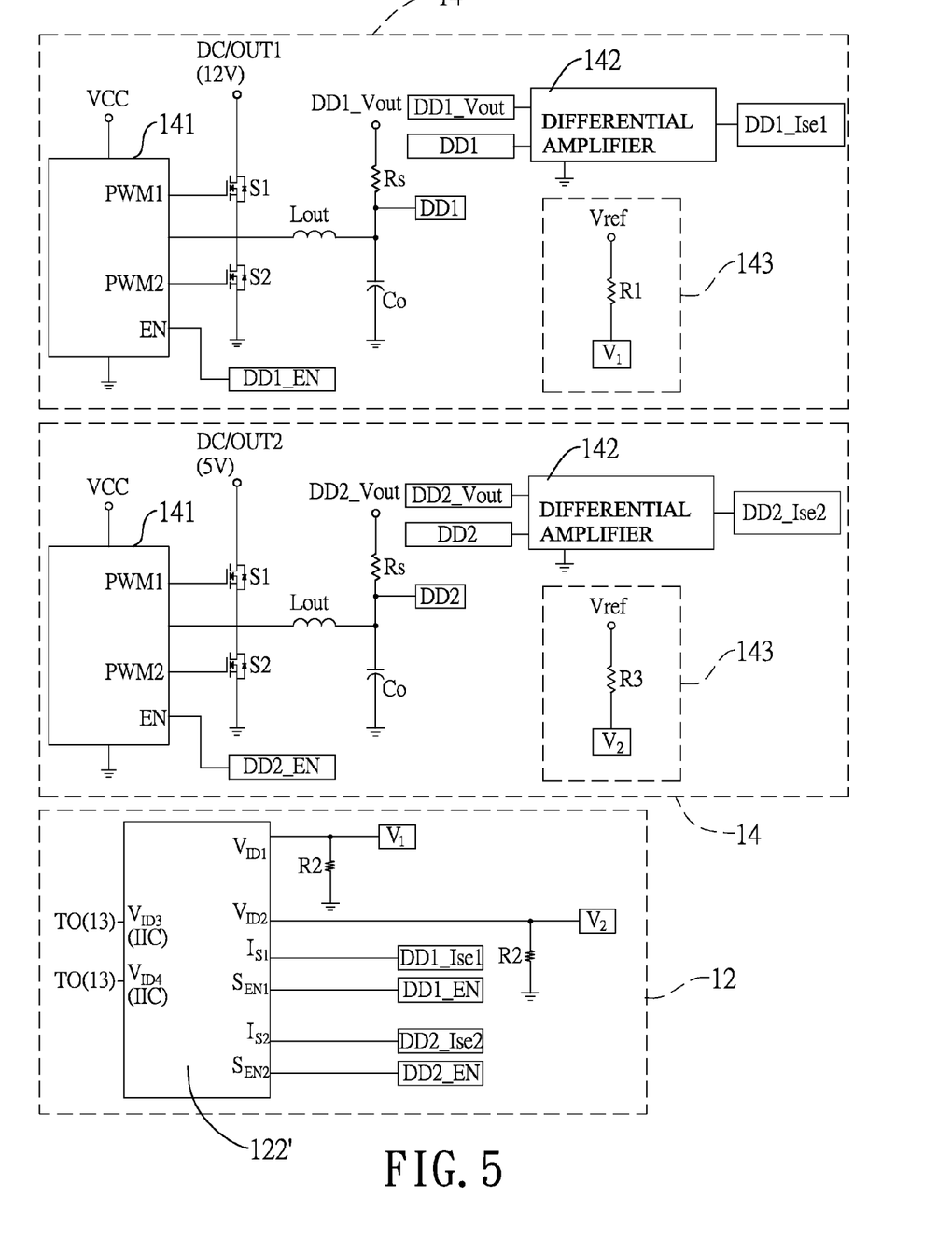
FIG. 5 is a first circuit diagram applicable to the universal power supply system in FIG. 2 or FIG. 3.

With reference to FIG. 5, a first circuit diagram that is applicable to the first embodiment of the universal power supply system is shown. In comparison with the universal power supply system in FIG. 4, the universal power supply system in FIG. 5 further has one more board mounted DC power module 14. The specification setting circuit 143 of each board mounted DC power module 14 is a voltage divider circuit having a top resistor and a bottom resistor R1/R2, R3/R2. Each voltage divider circuit is connected to an identical reference voltage Vref. Given different resistance values of the top resistors R1, R3 in the two voltage divider circuits, the monitoring circuit 122' can read different voltages from the two specification identification terminals $V_{ID1}$, $V_{ID2}$ and compare them with the voltages in the specification mapping table, and read corresponding critical current values and set them as the critical current values of the respective board mounted DC power modules 14 if matching voltages in the specification mapping table are found. Hence, the critical current value of each board mounted DC power module 14 can be automatically set up as a monitoring point for OCP of the board mounted DC power module 14.

Similarly, the circuit diagram in FIG. 5 is also applicable to the second embodiment of the universal power supply system. The specification mapping table built in the monitoring circuit 122' further has multiple model numbers corresponding to various AC/DC power supply devices and multiple critical power values corresponding to the model numbers. The specification setting circuit of each AC/DC power supply device 13 is also a voltage divider circuit. By setting an identical reference voltage and selecting a top resistor with a different resistance value, the monitoring circuit 122' acquires the output voltage specified by each AC/DC power supply device, compares the output voltage with the voltages in the specification mapping table, reads a corresponding critical power value in the specification mapping table, and sets up as the critical power value of the AC/DC power supply device 13 if a matching voltage in the specification mapping table is found. Hence, the critical power value of each AC/DC power supply device 13 can be automatically set up as a monitoring point for OPP.

Figure 6:
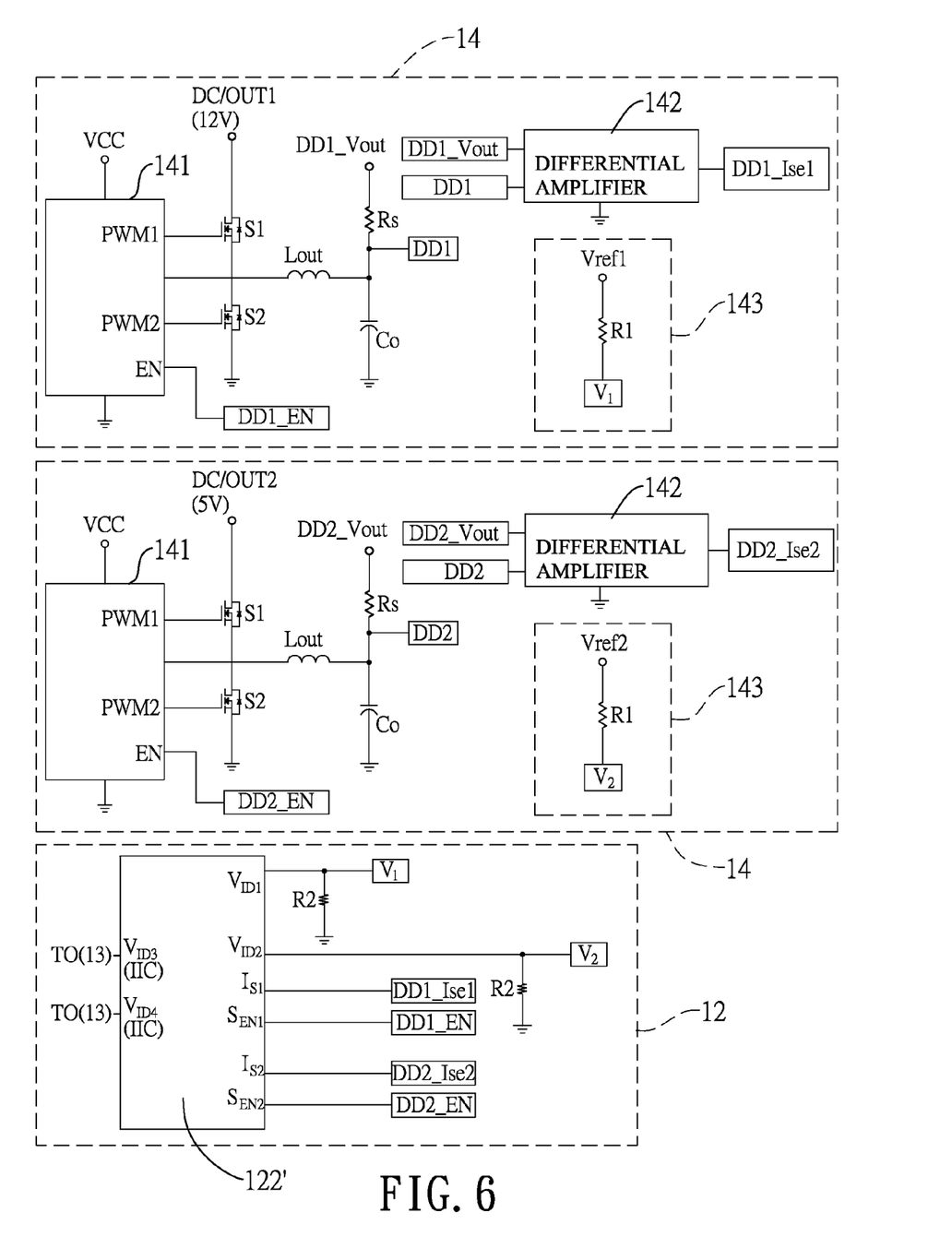
FIG. 6 is a second circuit diagram applicable to the universal power supply system in FIG. 2 or FIG. 3.

To allow the monitoring circuit 122' to identify a specification of each board mounted DC power module from the voltage of the specification identification terminal and to further set up a proper critical current value, with reference to FIG. 6, which is a second circuit diagram that is applicable to the first embodiment of the universal power supply system, the specification identification circuits 143 in the board mounted DC power modules 14 may be two identical voltage divider circuits respectively connected with different reference voltages Vref1, Vref2.

Figure 7:
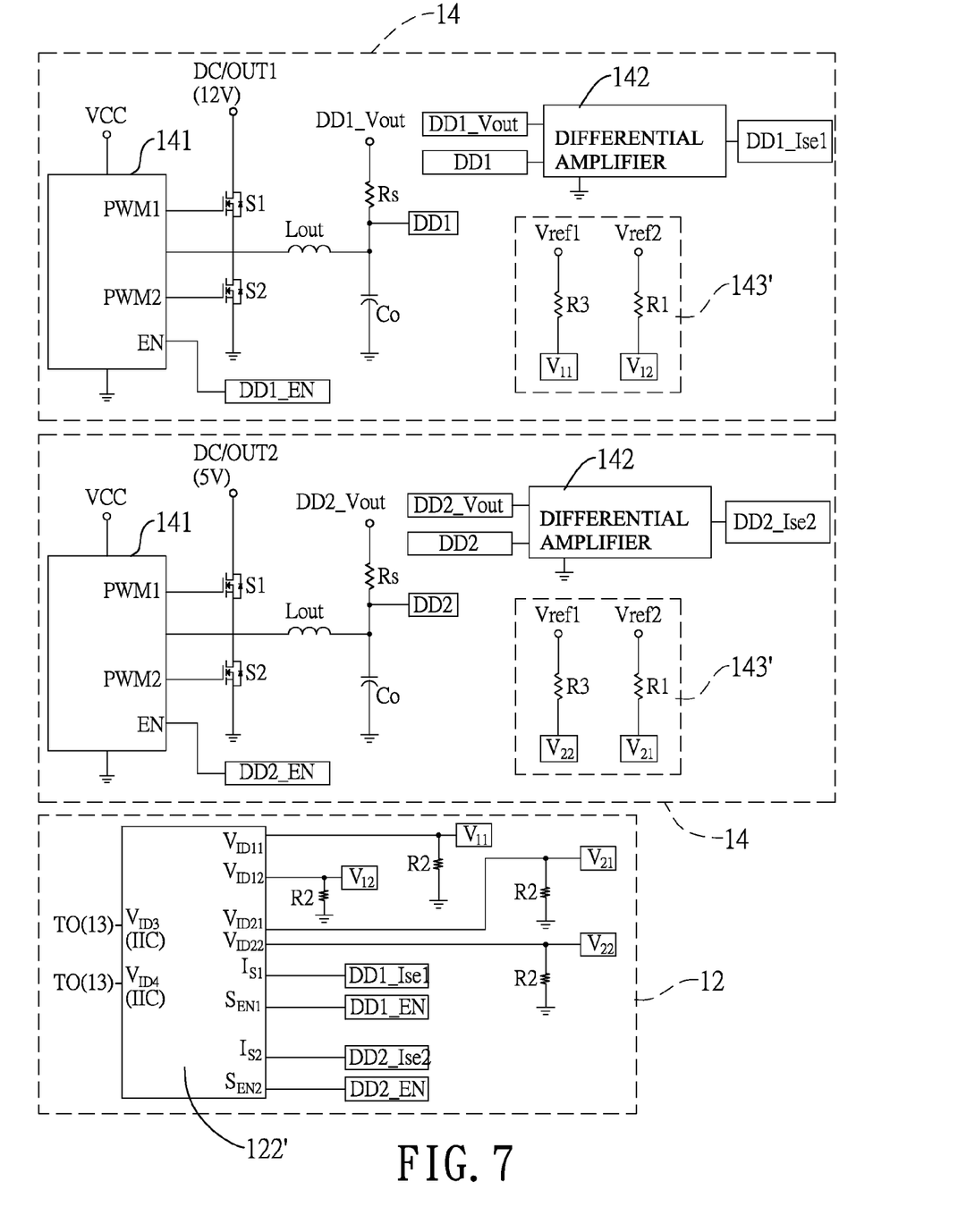
FIG. 7 is a third circuit diagram applicable to the universal power supply system in FIG. 2 or FIG. 3.

With reference to FIG. 7, a third circuit diagram that is applicable to the first embodiment of the universal power supply system is shown. Each specification setting circuit 143' has multiple voltage divider circuits respectively connected with multiple reference voltages Vref1, Vref2 with different high voltage levels and low voltage levels. Therefore, each specification setting circuit 143' outputs multiple voltage signals with different voltage levels to the monitoring circuit 122'. To correspond to the specification identification terminals of the specification setting circuits 143', each specification identification terminal of the monitoring circuit 122' also has multiple specification identification sub-terminals $V_{ID11}$ and $V_{ID12}$, $V_{ID21}$ and $V_{ID22}$ respectively connected to the series connected nodes of the voltage divider circuits of the specification setting circuits 143' to read a high voltage signal and a low voltage signal from each specification setting circuit 143'. Given FIG. 7 as an example, each specification setting circuit 143' has two voltage divider circuits. Suppose that Vref1>Vref2. The two specification identification terminals $V_{ID11}$ and $V_{ID12}$ respectively read a high voltage signal and a low voltage interpreted as logic 1 and 0 from one of the two specification setting circuits 143' and the two specification identification terminals $V_{ID21}$ and $V_{ID22}$ read a low voltage signal and a high voltage signal interpreted as logic 0 and 1 from the other specification setting circuit 143'. Hence, the monitoring circuit 122' can identify the model number of each board mounted DC power module according to the voltage signals of the specification identification terminals.

Figure 8:
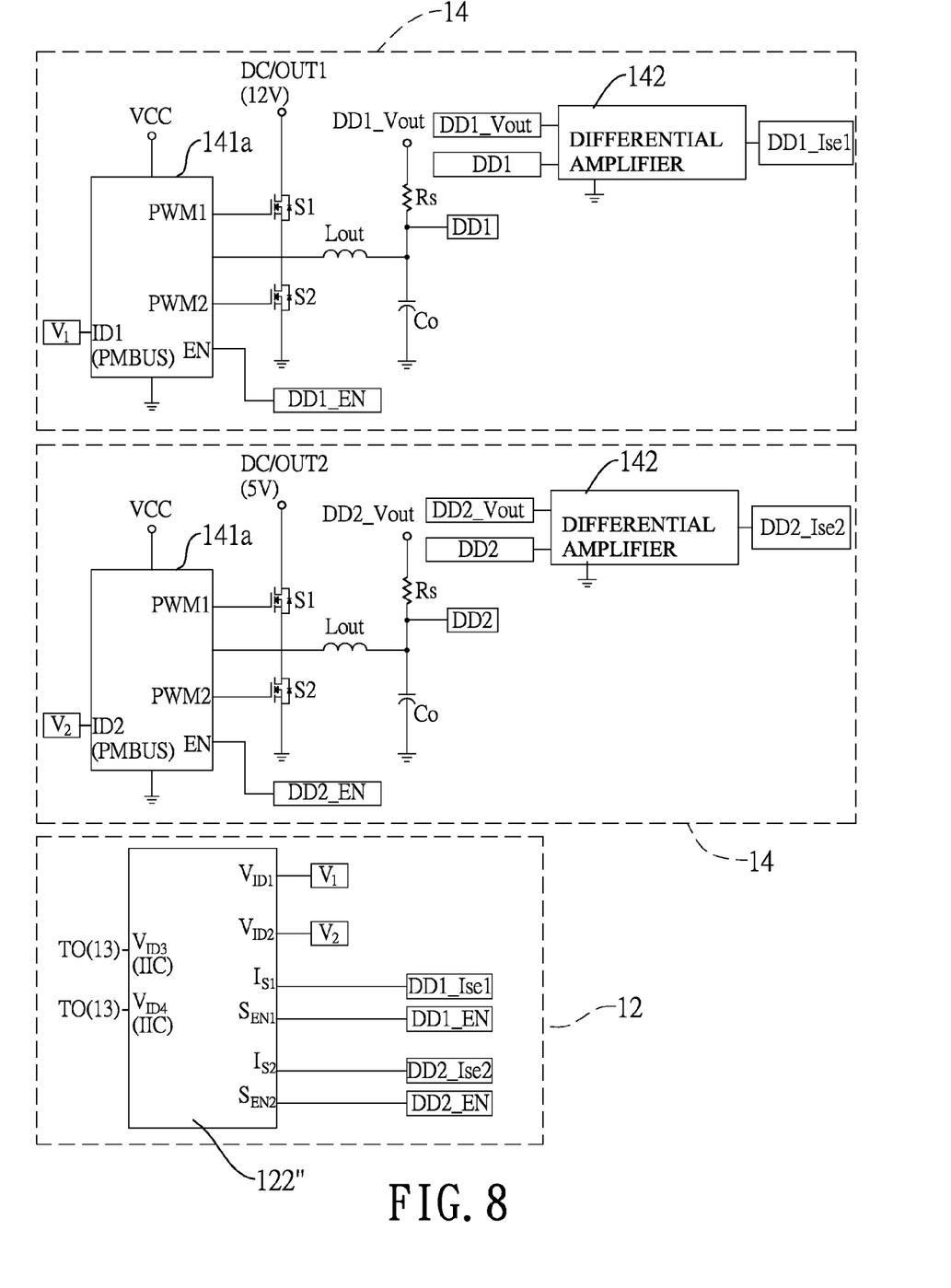
FIG. 8 is a fourth circuit diagram applicable to the universal power supply system in FIG. 2 or FIG. 3.

With reference to FIG. 8, a fourth circuit diagram that is applicable to the first embodiment of the universal power supply system is shown. Each specification setting circuit 143 is integrated in the controller 141a of a corresponding board mounted DC power module 14. In other words, the controller 141a is connected to the specification setting terminals V1, V2 and is built in with specification data, which can be transmitted to the monitoring circuit 122' in the form of PM BUS signals for the monitoring circuit 122' to directly acquire the specification data, determine a model number of the current board mounted DC power module 14, and read a critical current value in the specification mapping table. Likewise, the specification setting circuit of each AC/DC power supply device 13 is integrated in a corresponding secondary controller. In other words, the secondary controller is connected to the specification setting terminals V3, V4, and is built in with specification data, which can be transmitted to the monitoring circuit 122" in the form of PM BUS signals and IIC signals for the monitoring circuit 122' to directly acquire the specification data, determine a model number of the current board mounted DC power module 14, and read a critical power value in the specification mapping table. A minimum of all the retrieved critical power values is taken as a critical power value for monitoring over-power condition.

As the monitoring circuit can detect the AC/DC power supply device currently supplying power, the critical power value can be read from the specification mapping table according to the model number and is taken as a monitoring point for OPP. When the universal power supply system has two 500 W AC/DC power supply devices operated under the parallel output mode, the monitoring circuit uses the model number of one of the AC/DC power supply devices to set up a critical power value corresponding to the AC/DC power supply device from the specification mapping table as a monitoring point for OPP. When the universal power supply system has an 875 W AC/DC power supply device and a 500 W AC/DC power supply device and the 875 W AC/DC power supply device is selected as the master, the monitoring circuit then reads the model number of the 875 W AC/DC power supply device and sets up critical power value corresponding to the 875 W AC/DC power supply device from the specification mapping table as a monitoring point for OPP. On the other hand, when the 500 W AC/DC power supply device is selected as the master, the monitoring circuit reads the model number of the 500 W AC/DC power supply device and sets up critical power value corresponding to the 500 W AC/DC power supply device from the specification mapping table as a monitoring point for OPP to protect the 500 W AC/DC power supply device.

In sum, after all the board mounted DC power modules are plugged in the corresponding DC power I/O ports, the back board module can automatically detect the model numbers of all the board mounted DC power modules and set up the corresponding critical current value for each board mounted DC power module as a monitoring point for OCP to monitor if the board mounted DC power module outputs a current over a corresponding critical current value. It is unnecessary for the backboard module to be redesigned when different board mounted DC power modules are applied and a foolproof function can be provided. Besides, after all AC/DC power supply devices at the input side are connected to the backboard module, similarly, the backboard module can automatically detect the model numbers of all the AC/DC power supply devices and set up the corresponding critical power value for each AC/DC power supply module as a monitoring point for OPP to monitor if the AC/DC power supply device outputs a power over a corresponding critical current value. It is unnecessary for the backboard module to be redesigned when different AC/DC power supply devices are applied and a foolproof function can be provided.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A universal power supply system comprising:
    a housing;

a backboard module mounted to the housing, and having:
multiple DC power and communication interfaces, each having a DC power input and output (I/O) port; and
a monitoring circuit electrically connected to the DC power and communication interfaces and having:
multiple enable terminals;
multiple current detection terminals;
multiple specification identification terminals; and
a specification mapping table built therein and storing multiple model numbers and multiple critical current values corresponding to the model numbers;
multiple AC-to-DC (AC/DC) power supply devices at an input side mounted inside the housing, each AC/DC power supply device having a DC power output terminal connected to the DC power I/O port of one of the DC power and communication interfaces; and
multiple board mounted DC power modules mounted inside the housing, and plugged in corresponding DC power and communication interfaces of the backboard module, each board mounted DC power module having:
a specification setting circuit;
a specification setting terminal electrically connected to a corresponding specification identification terminal of the monitoring circuit;
an enable terminal electronically connected to a corresponding enable terminal of the monitoring circuit; and
a current output terminal connected to a corresponding current detection terminal of the monitoring circuit;
wherein the monitoring circuit reads a specification identification signal from the specification setting circuit of each board mounted DC power module, identifies a model number according to the specification identification signal and sets a critical current value for overcurrent protection of the respective board mounted DC power module to the critical current value in the specification mapping table corresponding to the identified model number.

2. The universal power supply system as claimed in claim 1, wherein the specification setting circuit of each board mounted DC power module has a voltage divider circuit connected to a reference voltage and having a series connected node being the specification setting terminal.

3. The universal power supply system as claimed in claim 2, wherein the voltage divider circuits of the respective board mounted DC power modules are identical, and the reference voltages connected to the voltage divider circuits of the respective board mounted DC power modules are different.

4. The universal power supply system as claimed in claim 2, wherein the voltage divider circuits of the respective board mounted DC power modules are different, and the reference voltages connected to the voltage divider circuits of the respective board mounted DC power modules are identical.

5. The universal power supply system as claimed in claim 4, wherein each voltage divider circuit of a corresponding board mounted DC power module has a top resistor and a bottom resistor, and the top resistors of the voltage divider circuits of the board mounted DC power modules have different resistance values.

6. The universal power supply system as claimed in claim 1, wherein
the specification setting terminal of each board mounted DC power module has multiple specification setting sub-terminals;
the specification setting circuit of each board mounted DC power module has multiple voltage divider circuits respectively connected to multiple reference voltages with different high voltage levels and low voltage levels, wherein each voltage divider circuit has a series connected node being a corresponding specification setting sub-terminal; and
each specification identification terminal of the monitoring circuit has multiple specification identification sub-terminals respectively connected to the series connected nodes of the voltage divider circuits of the specification setting circuits of the board mounted DC power modules.

7. The universal power supply system as claimed in claim 2, wherein the specification mapping table built in the monitoring circuit further has multiple voltage values corresponding to the respective model numbers.

8. The universal power supply system as claimed in claim 7, wherein when reading a specification identification signal of each specification identification terminal, the monitoring circuit compares the specification identification signal with the voltage values in the specification mapping table until a matching voltage value is found, then reads the model number corresponding to the matching voltage value, and sets the critical current value corresponding to the model number as a critical current value for the board mounted DC power module connected to the specification identification terminal.

9. The universal power supply system as claimed in claim 1, wherein
each board mounted DC power module has a controller connected to the specification setting terminals and built in with specification data; and
the specification setting circuit of the board mounted DC power module is integrated in the controller.

10. The universal power supply system as claimed in claim 9, wherein the monitoring circuit reads the specification data transmitted through each specification identification terminal thereof, compares the specification data with the model number in the specification mapping table until a matching model number is found, then sets the critical current value corresponding to the model number as a critical current value for the board mounted DC power module connected to the specification identification terminal.

11. A universal power supply system comprising:
a housing;
a backboard module mounted to the housing, and having:
multiple DC power and communication interfaces, each having a DC power input and output (I/O) port; and
a monitoring circuit electrically connected to the DC power and communication interfaces and having:
multiple enable terminals;
multiple specification identification terminals; and
a specification mapping table built therein and storing multiple model numbers and multiple critical power values corresponding to the model numbers;
multiple AC/DC power supply devices at an input side mounted inside the housing, each AC/DC power supply device having:
a DC power output terminal connected to the DC power I/O port of one of the DC power and communication interfaces;
a specification setting circuit; and
a specification setting terminal electrically connected to a corresponding specification identification terminal of the monitoring circuit;
multiple board mounted DC power modules mounted inside the housing, and plugged in corresponding DC power and communication interfaces of the backboard module.

12. The universal power supply system as claimed in claim 11, wherein the specification setting circuit of each AC/DC power supply device has a voltage divider circuit connected to a reference voltage and having a series connected node being the specification setting terminal.

13. The universal power supply system as claimed in claim 12, wherein the voltage divider circuits of the respective AC/DC power supply devices are identical, and the reference voltages connected to the voltage divider circuits of the respective AC/DC power supply devices are different.

14. The universal power supply system as claimed in claim 12, wherein the voltage divider circuits of the respective AC/DC power supply devices are different, and the reference voltages connected to the voltage divider circuits of the respective AC/DC power supply devices are identical.

15. The universal power supply system as claimed in claim 13, wherein each voltage divider circuit of a corresponding AC/DC power supply device has a top resistor and a bottom resistor, and the top resistors of the voltage divider circuits of the AC/DC power supply devices have different resistance values.

16. The universal power supply system as claimed in claim 11, wherein
the specification setting terminal of each AC/DC power supply device has multiple specification setting sub-terminals;
the specification setting circuit of each AC/DC power supply device has multiple voltage divider circuits respectively connected to multiple reference voltages with different high voltage levels and low voltage levels, wherein each voltage divider circuit has a series connected node being a corresponding specification setting sub-terminal; and
each specification identification terminal of the monitoring circuit has multiple specification identification sub-terminals respectively connected to the series connected nodes of the voltage divider circuits of the specification setting circuits of the AC/DC power supply devices.

17. The universal power supply system as claimed in claim 12, wherein the specification mapping table built in the monitoring circuit further has multiple voltage values corresponding to the respective model numbers.

18. The universal power supply system as claimed in claim 17, wherein when reading a specification identification signal of each specification identification terminal, the monitoring circuit compares the specification identification signal with the voltage values in the specification mapping table until a matching voltage value is found, then reads the model number corresponding to the matching voltage value, and sets the critical power value corresponding to the model number as a critical power value for the AC/DC power supply device connected to the specification identification terminal.

19. The universal power supply system as claimed in claim 11, wherein
each AC/DC power supply device has a secondary controller connected to the specification setting terminals and built in with specification data; and
the specification setting circuit of the AC/DC power supply device is integrated in the secondary controller.

20. The universal power supply system as claimed in claim 19, wherein the monitoring circuit reads the specification data transmitted through each specification identification terminal thereof, compares the specification data with the model number in the specification mapping table until a matching model number is found, then sets the critical power value corresponding to the model number as a critical power value for the AC/DC power supply device connected to the specification identification terminal.

* * * * *